US007801691B2

(12) United States Patent
Panciroli et al.

(10) Patent No.: US 7,801,691 B2
(45) Date of Patent: Sep. 21, 2010

(54) METHOD FOR ACQUISITION AND PROCESSING OF AN INTAKE PRESSURE SIGNAL IN AN INTERNAL COMBUSTION ENGINE WITHOUT AN INTAKE MANIFOLD

(75) Inventors: Marco Panciroli, Bologna (IT); Loris Lambertini, Crespellano (IT); Francesco Alunni, San Sisto (IT); Matteo Domenico Albertazzi, Bologna (IT); Marco Montaguti, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 86 days.

(21) Appl. No.: 12/167,994

(22) Filed: Jul. 3, 2008

(65) Prior Publication Data

US 2009/0018783 A1 Jan. 15, 2009

(30) Foreign Application Priority Data

Jul. 5, 2007 (EP) .................................. 07425411

(51) Int. Cl.
*G01F 1/00* (2006.01)

(52) U.S. Cl. ........................................................ 702/47

(58) Field of Classification Search ................... 702/47; 701/102, 103, 115
See application file for complete search history.

(56) References Cited

U.S. PATENT DOCUMENTS 3,612,014 A * 10/1971 Tenney ..................... 123/73 A
4,336,593 A 6/1982 Takase
6,366,847 B1 4/2002 Sun et al.
2002/0029764 A1 3/2002 Machida

FOREIGN PATENT DOCUMENTS

EP 1342903 A 9/2003
EP 1 433 944 A 6/2004
FR 2 836 223 A 8/2003
JP 59 128947 A 7/1984
JP 05 187305 A 7/1993
WO WO 03/018978 3/2003

* cited by examiner

*Primary Examiner*—Drew A Dunn
*Assistant Examiner*—Stephen J Cherry
(74) *Attorney, Agent, or Firm*—Mitchell P. Brook; Luce, Forward, Hamilton & Scripps LLP

(57) ABSTRACT

Method of acquisition and processing of an intake pressure signal in an internal combustion engine without an intake manifold; the internal combustion engine having at least one cylinder that receives fresh air through an intake duct, which is controlled by a butterfly valve and is provided with a pressure sensor connected to an electronic control unit. The acquisition and processing method provides for the following steps: measuring, via the pressure sensor, the instantaneous induction pressure at a plurality of different crank angles distributed over an engine cycle; storing, during each engine cycle, the instantaneous induction pressures in a fast acquisition buffer of the electronic control unit; and determining, at the end of each engine cycle, the mean induction pressure in the engine cycle by calculating a mean of the instantaneous induction pressures previously stored in the fast acquisition buffer of the electronic control unit.

31 Claims, 3 Drawing Sheets

METHOD FOR ACQUISITION AND PROCESSING OF AN INTAKE PRESSURE SIGNAL IN AN INTERNAL COMBUSTION ENGINE WITHOUT AN INTAKE MANIFOLD

TECHNICAL FIELD

The present invention concerns a method for the acquisition and processing of an intake pressure signal in an internal combustion engine without an intake manifold.

BACKGROUND ART

In recent years the so-called "speed density" control system, which needs to know the mean intake pressure with adequate accuracy in order to calculate the mass of fresh air trapped inside each cylinder, has become increasingly widespread for the control of an internal combustion engine.

A modern internal combustion engine for cars is provided with a number of cylinders (typically four in line), each of which is connected to an intake manifold via two intake valves and to an exhaust manifold via two exhaust valves; the intake manifold receives fresh air (i.e. air arriving from the outside environment) through an intake duct controlled by a butterfly valve and is connected to the cylinders via the respective intake ports, each of which is controlled by the corresponding intake valves. In an internal combustion engine fitted with an intake manifold, the pressure pulses inside the intake manifold are modest due to the effect of the volume of intake manifold itself; in consequence, in order to determine the mean intake pressure in an internal combustion engine fitted with an intake manifold (i.e. the average value of the pressure inside the intake manifold), it is sufficient to measure two intake pressure values via a pressure sensor positioned inside the intake manifold on every engine cycle (i.e. every 720° of rotation of the drive shaft).

Owing to the numerous advantages provided by the "speed density" control system for controlling an internal combustion engine, there is a desire to use this system on internal combustion engines for motorcycles or racing as well; however, internal combustion engines for motorcycles or racing do not normally have an intake manifold and each cylinder is directly connected to the air cleaner box (containing the air filter) via a short intake port (or intake trumpet) controlled by a respective butterfly valve. In this case, a pressure sensor is inserted inside each intake port; however, in an intake port of an internal combustion engine without an intake manifold, pressure pulsing is extremely high, even in idle conditions, and therefore it is much more difficult to be able to calculate a mean intake pressure value with sufficient precision without employing an electronic control unit with very high computing power.

DISCLOSURE OF INVENTION

The object of present invention is to provide a method for the acquisition and processing of an intake pressure signal in an internal combustion engine without an intake manifold, this method being devoid of the above-mentioned drawbacks and, in particular, of simple and economic implementation.

According to the present invention, a method for the acquisition and processing of an intake pressure signal in an internal combustion engine without an intake manifold is provided in accordance with that recited by the attached claims.

BRIEF DESCRIPTION OF THE DRAWINGS

The present invention will now be described with reference to the enclosed drawings, which illustrate a non-limitative example of embodiment, in which.

PREFERRED EMBODIMENTS OF THE INVENTION

Figure 1:
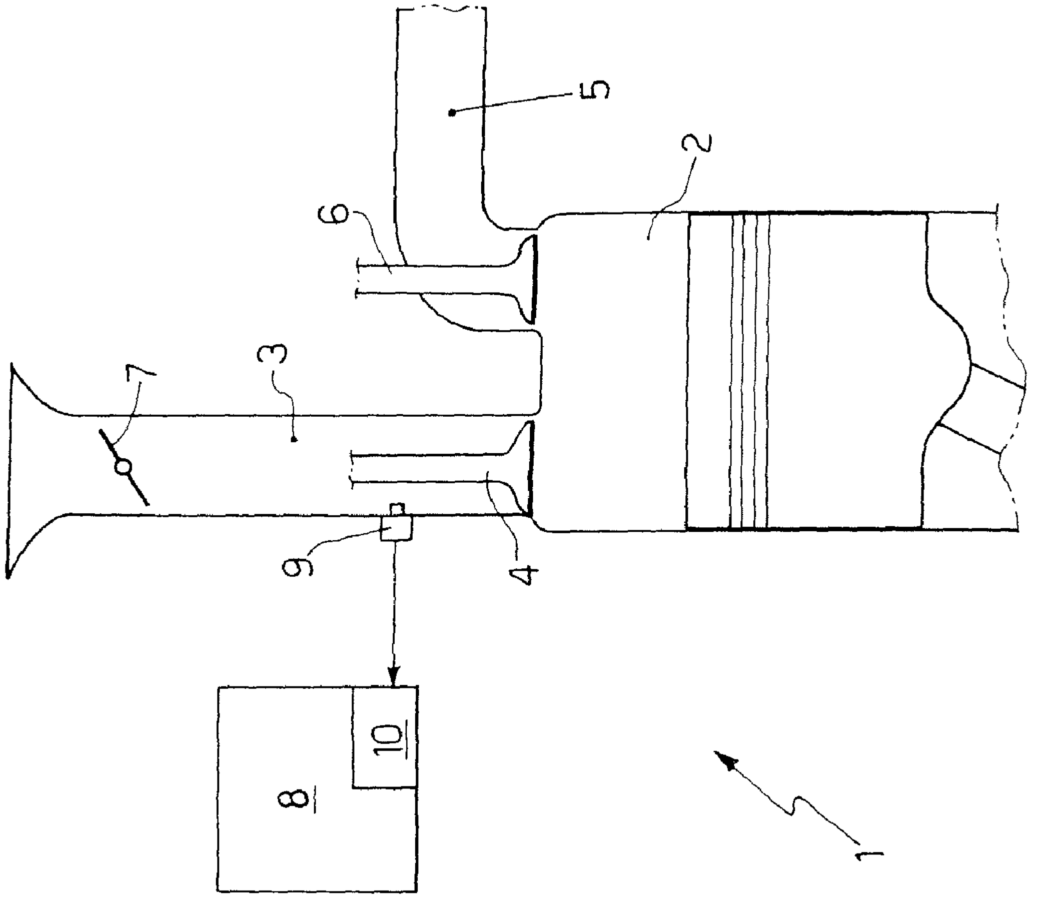
FIG. 1 is a schematic view of an internal combustion engine that implements the method of intake pressure signal acquisition and processing, the subject of the present invention.

In FIG. 1, reference numeral 1 indicates an internal combustion engine for motorcycles in its entirety. The internal combustion engine 1 is provided with a number of cylinders 2 (only one of which is shown in FIG. 1), each of which is connected to a respective intake port 3 (or intake trumpet) by means of two intake valves 4 (only one of which is shown in FIG. 1) and an exhaust port 5 by means of two exhaust valves 6 (only one of which is shown in FIG. 1). Each intake port 3 runs from an air cleaner box (containing an air filter) to receive fresh air (i.e. air arriving from the outside environment) and is controlled by a butterfly valve 7.

An electronic control unit 8 presides over the operation of the internal combustion engine 1 via the so-called "speed density" control system, which needs to know the mean value of the intake pressure (i.e. the pressure present in each intake port 3) with sufficient precision in order to calculate the mass of fresh air trapped inside the cylinder 2. To determine the mean intake pressure inside the intake port 3, the electronic control unit 8 is connected to a pressure sensor 9, which is positioned as far away from the butterfly valve 7 as possible and therefore as close as possible to the intake valves 4, where the form and level of pressure are more significant. The pressure sensor 9 can be mounted directly in the intake port 3 or can be pneumatically connected to the intake port 3 via a tube that has a pressure tap with a calibrated hole.

The electronic control unit 8 includes a fast acquisition buffer 10, which receives the measurements supplied by the pressure sensor 9. In particular, the storing of the instantaneous induction pressures in the fast acquisition buffer 10 of the electronic control unit 8 is directly controlled by the BIOS of the electronic control unit 8 without needing a special software call; in other words, the acquisition of the measurements supplied by the pressure sensor 9 in the fast acquisition buffer 10 is managed directly by the low-level software present in the BIOS, without requiring specific intervention of the CPU managed by high-level software.

In use, the electronic control unit 8 measures, via the pressure sensor 9, the instantaneous induction pressure at a plurality of different crank angles distributed over an engine cycle, and estimates the mean induction pressure in an engine cycle by calculating the average of the instantaneous induction pressures measured during the engine cycle itself. As previously mentioned, the instantaneous induction pressures read by the pressure sensor 9 during the engine cycle are stored in the fast acquisition buffer 10 of the electronic control unit 8; then, at the end of each engine cycle, the mean induction pressure of engine cycle is determined by calculating an average of the instantaneous induction pressures previously stored in the fast acquisition buffer 10 of the electronic control unit 8. If necessary, the mean induction pressure in the engine cycle could be determined by calculating a weighted mean in function of the crank angle of the instantaneous induction pressures previously stored in the fast acquisition buffer 10; in other words, the instantaneous induction pressures measured at a few fixed crank angles could be considered more significant (i.e. with a higher weight) than other instantaneous induction pressures.

Figure 2:
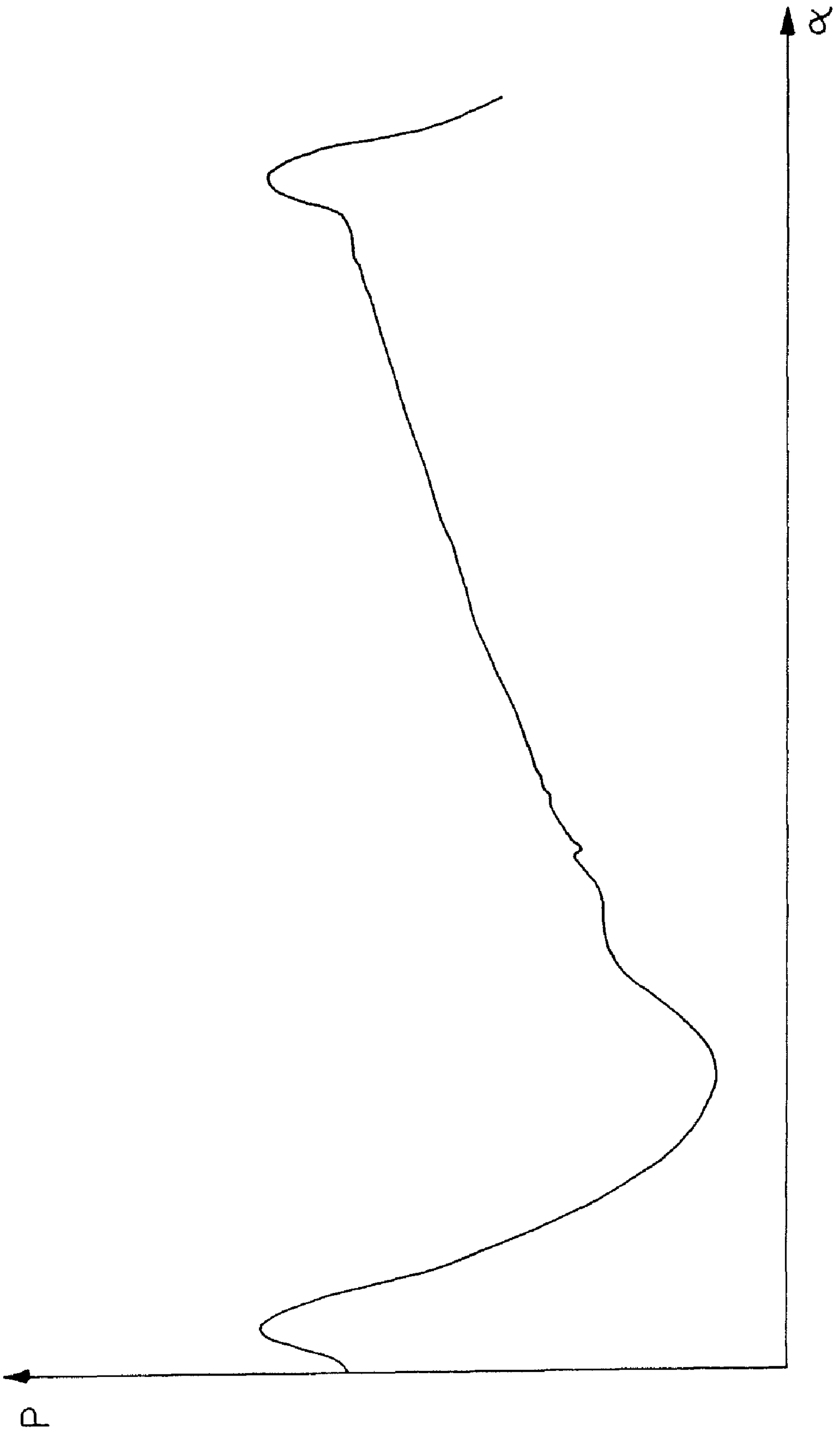
FIGS. 2 and 3 are two graphs that show the variation in the induction pressure of the engine in FIG. 1 as the crank angle changes (i.e. the angular position of the drive shaft).

An experimental obtained graph is illustrated in FIG. 2 that shows the variation in instantaneous induction pressure during an engine cycle, which in the four-stroke internal combustion engine 1 covers a 720° crank angle (i.e. the angular position of a drive shaft). In particular, from left to right in FIG. 2, it is possible to discern a TDC (Top Dead Centre) corresponding to the start of the intake phase, a BDC (Bottom Dead Centre) corresponding to the start of the compression phase, a TDC (Top Dead Centre) corresponding to the start of the power phase, a BDC (Bottom Dead Centre) corresponding to the start of the exhaust phase, and a further discernable TDC (Top Dead Centre) corresponding to the start of the next intake phase.

According to a preferred embodiment, the acquisition frequency of the instantaneous induction pressures is directly proportional to the engine speed, so that a constant number of instantaneous induction pressures are measured in each engine cycle; for example, 120 instantaneous induction pressures can be measured in each engine cycle by taking a measurement every 6° of crank angle. Normally, the mean induction pressure in an engine cycle is determined at the intake BDC, i.e. an engine cycle for determining the mean induction pressure starts and finishes with the intake BDC. Nevertheless, to avoid excessively overloading the electronic control unit 8 during the intake BDC, when the electronic control unit 8 must carry out numerous other operations, the mean induction pressure in the engine cycle could be determined at another crank angle, for example, in correspondence to the crank angle when the intake valves 4 close.

According to a possible embodiment, the instantaneous induction pressures stored in the fast acquisition buffer 10 during each engine cycle could be used not just for determining the mean induction pressure, but also for determining the minimum and maximum values of induction pressure.

If the internal combustion engine 1 is single-cylinder (i.e. it has only one cylinder 2), the implementation of the above-described method of intake pressure signal acquisition and processing is immediate. If the internal combustion engine 1 is multi-cylinder (i.e. it has more than one cylinder 2), there are two possibilities: if the electronic control unit 8 is able to handle a respective fast acquisition buffer 10 for each cylinder 2, then implementation of the above-described method of intake pressure signal acquisition and processing is immediate, otherwise, if the electronic control unit 8 is able to handle just one fast acquisition buffer 10, then it becomes necessary to share the single fast acquisition buffer 10 between all of the cylinders 2 present.

For example, if two cylinders 2 are present, the mean intake pressures of the two cylinders 2 are determined alternately, such that the mean intake pressure of a cylinder 2 is determined during one engine cycle and the mean intake pressure of the other cylinder 2 is determined in the next engine cycle. During the engine cycle in which the mean intake pressure of a cylinder 2 is not determined, the mean intake pressure of that cylinder 2 is assumed equal to the mean intake pressure determined in the previous engine cycle. Alternatively, during the engine cycle in which the mean intake pressure of a cylinder 2 is not determined, the mean intake pressure of that cylinder 2 is assumed equal to the mean intake pressure determined in the previous engine cycle corrected by means of a correction factor k.

The correction factor k is calculated from the difference or the ratio between an instantaneous induction pressure measured during the engine cycle at a given comparative crank angle and a corresponding instantaneous induction pressure measured during the previous engine cycle at the same given crank angle. The instantaneous induction pressure measured at a comparative crank angle requires a specific high-level software call, as the fast acquisition buffer 10 is occupied with the measurement of the instantaneous induction pressure of the other cylinder 2. In other words, the correction factor k is calculated using one of the two following equations:

$$K=P_i-P_{i-1}$$

$$K=P_i/P_{i-1}$$

P is the instantaneous induction pressure,

"i" is the current engine cycle in which the mean intake pressure is estimated as a function of the mean intake pressure in the previous engine cycle, and "i−1" is the previous engine cycle in which the mean intake pressure was determined on the basis of measurements from the pressure sensor 9.

When calculating the correction factor k, it is possible to use a sole instantaneous induction pressure value measured at a sole comparative crank angle, or it is possible to use the average of two (or possibly more) instantaneous induction pressure values measured at two distinct comparative crank angles; in this regard, the instantaneous induction pressure values measured at intake BDC and at a point of the exhaust stroke depending on the physical configuration of the system (for example, the diameter of the pressure tap hole of the pressure sensor 9, the length and diameter of the connection tube to the pressure sensor 9, characteristics of the pressure sensor 9, . . . ) are particularly significant.

In the case of a multi-cylinder internal combustion engine 1, more pressure sensors 9 are provided and associated with the cylinders 2; in this case, it is opportune to compensate the pressure sensors 9 between themselves with the internal combustion engine 1 not running: for example, it is possible to consider a first pressure sensor 9 as the reference and calculate the offsets of the other pressure sensors 9.

Normally, atmospheric pressure (necessary for correct control of the internal combustion engine 1) is assumed to be equal to the intake pressure when the internal combustion engine 1 is not running; alternatively, when the butterfly valve 7 is completely open, atmospheric pressure is assumed to be equal to the sum of the intake pressure and an offset value (which takes into account the load loss induced by the butterfly valve 7) dependent on the engine speed. However, it can happen that after being started, the internal combustion engine 1 is not run at full power (i.e. with the butterfly valve 7 completely open) for a very long time (even several hours); in consequence, it could turn out to be necessary to be able to estimate the atmospheric pressure when the internal combustion engine 1 is running and the butterfly valve 7 is not completely open.

Figure 3:
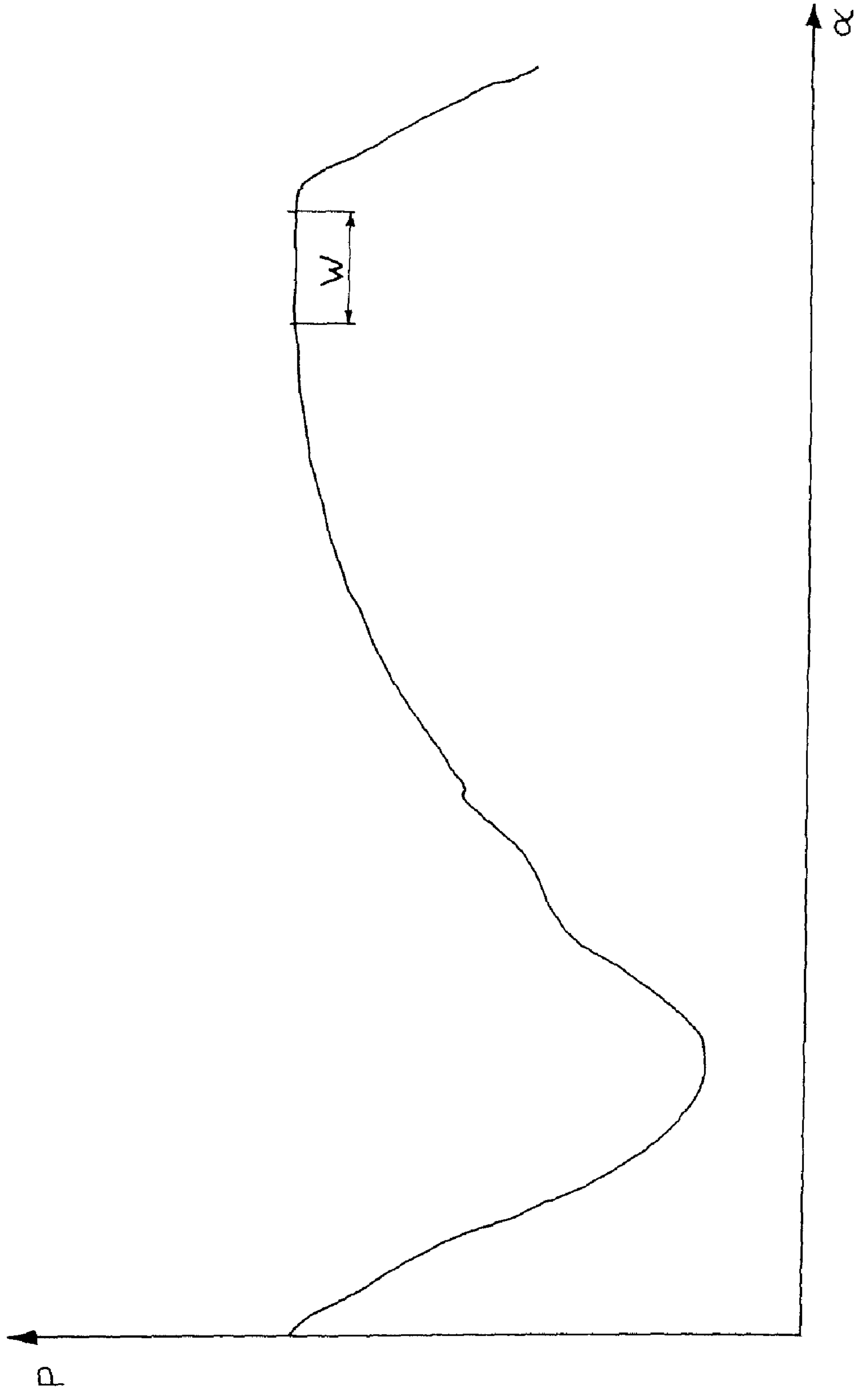

It is possible to determine the atmospheric pressure when the internal combustion engine 1 is running and the butterfly valve 7 is not completely open by measuring, via the pressure sensor 9, the instantaneous induction pressure at a plurality of different crank angles distributed in a measurement window W (shown in FIG. 3), determining a compensation factor dependent on engine speed and the position of the butterfly valve 7, and then determining the atmospheric pressure by applying the compensation factor to the mean of the instantaneous induction pressures measured in the measurement window W. The compensation factor is obtained by using an experimentally obtained map stored in the electronic control unit 8. Preferably, the measurement window W is placed at the end of the exhaust phase and the position (start angle and end angle) and/or possible the width of the measurement window W are dependent on engine speed (i.e. the start angle and end angle of the measurement window W depend on the engine speed).

The atmospheric pressure is only calculated if the instantaneous induction pressures remain more-or-less constant within the measurement window W, i.e. if the rate of change or derivative in the period before the instantaneous induction pressure measurement inside the measurement window W is small. Furthermore, the atmospheric pressure is only calculated if the internal combustion engine 1 is in a stable condition; the internal combustion engine 1 is considered to be in a stable condition if the difference between the instantaneous value of the engine speed and/or the position of the butterfly valve 7 is not too different from the corresponding filtered value (a first-order filter for example) of the engine speed and/or the position of the butterfly valve 7.

Finally, a new estimate of atmospheric pressure is only accepted if the difference compared to the previous estimate of atmospheric pressure is less than a first threshold of acceptability and/or only if the rate of change between the two atmospheric pressure estimates is less than a second threshold of acceptability.

Obviously, the atmospheric pressure estimate can be made more robust by calculating a number of values for atmospheric pressure in succession and taking the average of these atmospheric pressure values.

In the case of an engine with a relatively large number of cylinders 2 (e.g. four cylinders 2), it is possible to install a respective pressure sensor 9 in each intake port 3, or to use a reduced number of pressure sensors 9 each pneumatically interconnected with two or more or more intake ports 3; in the latter case, two or more intake ports 3 pneumatically connected to each other share a single pressure sensor 9.

The above-described method for the acquisition and processing of an intake pressure signal has numerous advantages, as it allows the mean intake pressure in each engine cycle to be determined with high precision, without delay, and without excessively burdening the electronic control unit 8. In fact, the above-described method for the acquisition and processing of an intake pressure signal allows a large number of instantaneous induction pressures to be measured on each engine cycle and saved in the fast acquisition buffer 10, which being controlled directly by the BIOS does not weigh on the execution of software in the electronic control unit 8.

Furthermore, the above-described method for the acquisition and processing of an intake pressure signal allows the atmospheric pressure to be determined with precision when the internal combustion engine 1 is running and the butterfly valve 7 is choked (i.e. not completely open).

The invention claimed is:

1. Method for the acquisition and processing of an intake pressure signal in an internal combustion engine including at least two cylinders, each of which receives fresh air through an intake port, which is controlled by a butterfly valve and is provided with a pressure sensor connected to an electronic control unit, the acquisition and processing method comprising the steps of:

measuring, via the pressure sensor, the instantaneous induction pressure at a plurality of different crank angles distributed over an engine cycle, estimating the mean induction pressure in an engine cycle, calculating an average of the instantaneous induction pressures measured during the engine cycle;

storing, during each engine cycle, the instantaneous induction pressures in a fast acquisition buffer of the electronic control unit;

determining, at the end of each engine cycle, the mean induction pressure in the engine cycle by calculating an average of the instantaneous induction pressures previously stored in the fast acquisition buffer of the electronic control unit; and determining alternately the mean intake pressures of the two cylinders, such that the mean intake pressure of a cylinder is determined during one engine cycle and the mean intake pressure of the other cylinder is determined in the next engine cycle.

2. Acquisition and processing method according to claim 1, wherein the storage of the instantaneous induction pressures in the fast acquisition buffer of the electronic control unit is controlled by the BIOS of the electronic control unit.

3. Acquisition and processing method according to claim 1, wherein the acquisition frequency of the instantaneous induction pressures is directly proportional to the engine speed, so that a substantially constant number of instantaneous induction pressure measurements are made in each engine cycle.

4. Acquisition and processing method according to claim 1, wherein the mean induction pressure in the engine cycle is determined at the end of the intake BDC.

5. Acquisition and processing method according to claim 1, wherein the mean induction pressure in the engine cycle is determined in correspondence to the crank angle on the closure of an intake valve.

6. Acquisition and processing method according to claim 1, wherein the mean induction pressure in each engine cycle is determined by calculating a weighted mean in function of the crank angle of the instantaneous induction pressures previously stored in the fast acquisition buffer.

7. Acquisition and processing method according to claim 1, wherein during the engine cycle when the mean intake pressure of a cylinder is not determined, the mean intake pressure of the same cylinder is assumed equal to the mean intake pressure determined in the previous engine cycle.

8. Acquisition and processing method according to claim 1, wherein during the engine cycle when the mean intake pressure of a cylinder is not determined, the mean intake pressure of the same cylinder is assumed equal to the mean intake pressure determined in the previous engine cycle corrected by means of a correction factor (k).

9. Acquisition and processing method according to claim 8, wherein the correction factor (k) is calculated from the difference or the ratio between an instantaneous induction pressure measured during the engine cycle at a given comparative crank angle and a corresponding instantaneous induction pressure measured during the previous engine cycle at the same given crank angle.

10. Acquisition and processing method according to claim 9, wherein the mean of at least two instantaneous induction pressure values measured at two distinct comparative crank angles are used to calculate the correction factor (k).

11. Acquisition and processing method according to claim 10, wherein a first comparative crank angle is the intake BDC and a second comparative crank angle is set along the exhaust stroke.

12. Acquisition and processing method according to claim 1 and including the additional steps of:

assuming an atmospheric pressure equal to the intake pressure when the internal combustion engine is not running; and assuming an atmospheric pressure equal to the sum of the intake pressure and an offset value dependent on the engine speed when the butterfly valve is completely open.

13. Acquisition and processing method according to claim 1, wherein the following steps are performed to determine the atmospheric pressure when the internal combustion engine is running and the butterfly valve is not completely open:

measuring, via the pressure sensor, the instantaneous induction pressure at a plurality of different crank angles distributed in a measurement window;

determining a compensation factor dependent on engine speed and the position of the butterfly valve; and determining the atmospheric pressure by applying the compensation factor to the mean of the instantaneous induction pressures measured in the measurement window.

14. Acquisition and processing method according to claim 13, wherein the start angle and end angle of the measurement window depend on the engine speed.

15. Acquisition and processing method according to claim 13, wherein the measurement window is placed at the end of the exhaust phase.

16. Acquisition and processing method according to claim 15, wherein the atmospheric pressure is only determined if the instantaneous induction pressures remain more-or-less constant within the measurement window.

17. Acquisition and processing method according to claim 13, wherein the atmospheric pressure is only determined if the internal combustion engine is in a stable condition.

18. Acquisition and processing method according to claim 17, wherein the internal combustion engine is considered to be in a stable condition if the difference between the instantaneous value of the engine speed and/or the position of the butterfly valve is not too different from the corresponding filtered value of the engine speed and/or the position of the butterfly valve.

19. Acquisition and processing method according to claim 18, wherein the instantaneous value of the engine speed and/or the position of the butterfly valve is filtered with a first-order filter.

20. Acquisition and processing method according to claim 13, wherein a new estimate of the atmospheric pressure is only accepted if the difference compared to the previous estimate of atmospheric pressure is less than a first threshold of acceptability and/or only if the rate of change between the two atmospheric pressure estimates is less than a second threshold of acceptability.

21. Method of acquisition and processing of an intake pressure signal in an internal combustion engine including at least one cylinder that receives fresh air through an intake port, which is controlled by a butterfly valve and is provided with a pressure sensor connected to an electronic control unit; to determine the atmospheric pressure when the internal combustion engine is running and the butterfly valve is not completely open the following steps are performed:

measuring, via the pressure sensor, the instantaneous induction pressure at a plurality of different crank angles distributed in a measurement window;

determining a compensation factor dependent on the engine speed and the position of the butterfly valve; and determining the atmospheric pressure by applying the compensation factor to the mean of the instantaneous induction pressures measured in the measurement window.

22. Acquisition and processing method according to claim 21, wherein the start angle and the end angle of the measurement window depend on the engine speed.

23. Acquisition and processing method according to claim 21, wherein the measurement window is placed at the end of the exhaust phase.

24. Acquisition and processing method according to claim 23, wherein the atmospheric pressure is only determined if the instantaneous induction pressures remain more-or-less constant within the measurement window.

25. Acquisition and processing method according to claim 21, wherein the atmospheric pressure is only determined if the internal combustion engine is in a stable condition.

26. Acquisition and processing method according to claim 25, wherein the internal combustion engine is considered to be in a stable condition if the difference between the instantaneous value of the engine speed and/or the position of the butterfly valve is not too different from the corresponding filtered value of the engine speed and/or the position of the butterfly valve.

27. Acquisition and processing method according to claim 26, wherein the instantaneous value of the engine speed and/or the position of the butterfly valve is filtered with a first-order filter.

28. Acquisition and processing method according to claim 21, wherein a new estimate of the atmospheric pressure is only accepted if the difference compared to the previous estimate of atmospheric pressure is less than a first threshold of acceptability and/or only if the rate of change between the two atmospheric pressure estimates is less than a second threshold of acceptability.

29. Method for the acquisition and processing of an intake pressure signal in an internal combustion engine including at least one cylinder that receives fresh air through an intake port, which is controlled by a butterfly valve and is provided with a pressure sensor connected to an electronic control unit, the acquisition and processing method comprising the steps of:

measuring, via the pressure sensor, the instantaneous induction pressure at a plurality of different crank angles distributed over an engine cycle;

estimating the mean induction pressure in an engine cycle, calculating an average of the instantaneous induction pressures measured during the engine cycle;

storing, during each engine cycle, the instantaneous induction pressures in a fast acquisition buffer of the electronic control unit; and determining, at the end of each engine cycle, the mean induction pressure in the engine cycle by calculating an average of the instantaneous induction pressures previously stored in the fast acquisition buffer of the electronic control unit;

wherein the mean induction pressure in the engine cycle is determined at the end of the intake BDC.

30. Method for the acquisition and processing of an intake pressure signal in an internal combustion engine including at least one cylinder that receives fresh air through an intake port, which is controlled by a butterfly valve and is provided with a pressure sensor connected to an electronic control unit, the acquisition and processing method comprising the steps of:

measuring, via the pressure sensor, the instantaneous induction pressure at a plurality of different crank angles distributed over an engine cycle;

estimating the mean induction pressure in an engine cycle, calculating an average of the instantaneous induction pressures measured during the engine cycle;

storing, during each engine cycle, the instantaneous induction pressures in a fast acquisition buffer of the electronic control unit; and determining, at the end of each engine cycle, the mean induction pressure in the engine cycle by calculating an average of the instantaneous induction pressures previously stored in the fast acquisition buffer of the electronic control unit;

wherein the mean induction pressure in the engine cycle is determined in correspondence to the crank angle on the closure of an intake valve.

31. Method for the acquisition and processing of an intake pressure signal in an internal combustion engine including at least one cylinder that receives fresh air through an intake port, which is controlled by a butterfly valve and is provided with a pressure sensor connected to an electronic control unit, the acquisition and processing method comprising the steps of:

measuring, via the pressure sensor, the instantaneous induction pressure at a plurality of different crank angles distributed over an engine cycle;

estimating the mean induction pressure in an engine cycle, calculating an average of the instantaneous induction pressures measured during the engine cycle;

storing, during each engine cycle, the instantaneous induction pressures in a fast acquisition buffer of the electronic control unit;

determining, at the end of each engine cycle, the mean induction pressure in the engine cycle by calculating an average of the instantaneous induction pressures previously stored in the fast acquisition buffer of the electronic control unit;

assuming an atmospheric pressure equal to the intake pressure when the internal combustion engine is not running; and assuming an atmospheric pressure equal to the sum of the intake pressure and an offset value dependent on the engine speed when the butterfly valve is completely open.

* * * * *